US012692980B2

(12) United States Patent
Pizzato et al.

(10) Patent No.: US 12,692,980 B2
(45) Date of Patent: Jul. 28, 2026

(54) SAFETY SWITCH FOR GUARDING ACCESSES

(71) Applicant: PIZZATO ELETTRICA S.R.L., Marostica (IT)

(72) Inventors: Marco Pizzato, Marostica (IT); Simone Zonta, Bassano del Grappa (IT)

(73) Assignee: PIZZATO ELETTRICA S.R.L., Marostica (IT)

( * ) Notice: Subject to any disclaimer, the term of this patent is extended or adjusted under 35 U.S.C. 154(b) by 230 days.

(21) Appl. No.: 18/280,228

(22) PCT Filed: Mar. 4, 2022

(86) PCT No.: PCT/IB2022/051921
§ 371 (c)(1),
(2) Date: Sep. 3, 2023

(87) PCT Pub. No.: WO2022/185266
PCT Pub. Date: Sep. 9, 2022

(65) Prior Publication Data
US 2024/0142053 A1 May 2, 2024

(30) Foreign Application Priority Data
Mar. 5, 2021 (IT) ........................ 102021000005189

(51) Int. Cl.
*F16P 3/08* (2006.01)
*G05B 9/02* (2006.01)
(52) U.S. Cl.
CPC . *F16P 3/08* (2013.01); *G05B 9/02* (2013.01)

(58) Field of Classification Search
CPC ..................................... F16P 3/08; G05B 9/02
See application file for complete search history.

(56) References Cited

U.S. PATENT DOCUMENTS

| | | | |
|---|---|---|---|
| 2007/0180869 A1* | 8/2007 | Geyer | D06F 39/14 68/196 |
| 2017/0336026 A1* | 11/2017 | Pizzato | F16P 3/08 |

FOREIGN PATENT DOCUMENTS

| | | |
|---|---|---|
| JP | H4-69808 U | 6/1992 |
| JP | H5-90712 U | 12/1993 |
| JP | 2017500724 A | 1/2017 |

(Continued)

OTHER PUBLICATIONS

Japanese Office Action of JP2023-550189 Mailed on Feb. 16, 2026.

*Primary Examiner* — Patrick N Edouard
*Assistant Examiner* — Eboni N Giles
(74) *Attorney, Agent, or Firm* — Rivka Friedman

(57) ABSTRACT
A safety switch for guarding access to industrial machines and plants comprises a switching device (2) provide with first anchoring means (9) to a fixed part of the access to be guarded, a driving device (3) adapted to be anchored to the movable part of the access and to interact with the switching means upon the opening/closing the access for opening/ closing one or more circuits, signaling means comprising one or more sources of light signals adapted to emit one or more light and/or visible signals representative of the state of said one or more circuits and wherein the switching device (2) has at least one portion or cap (6) made of a transparent or translucent material which encloses one or more of sources of light signals to make them visible from the outside at least in the powered condition.

16 Claims, 7 Drawing Sheets

(56)　　　　　　References Cited

FOREIGN PATENT DOCUMENTS

JP　　　　　2019517709 A　　6/2019
WO　　WO-2017208124 A1 *　12/2017　.......... H01H 27/002

* cited by examiner

SAFETY SWITCH FOR GUARDING ACCESSES

TECHNICAL FIELD

The present invention finds application in the field of electrical devices for industrial use and in particular its object is a safety switch designed to guard an access to a safety perimeter or barrier of an industrial machine or plant.

STATE OF THE ART

As known, the switches designed to guard the access to machines or industrial plants, such as protection panels, barriers, safety fences, comprise a switching device designed to be anchored to the fixed part of the access and a driving device designed to be anchored to the movable part.

In a known way, when the movable part is closed, the interaction between the switching device and the driving device is operated, making it possible to start the machine or plant, unless there are conditions that require the specific intervention of an operator.

By contrast, the opening of the access or the request for its opening, with consequent removal of the driving device from the switching device, causes the machine or plant to stop to allow the access thereto in a safe condition.

The switching device is also provided with electronic control means adapted to verify that all the safety conditions are fulfilled and to stop the machine or plant in case one or more of the safety conditions are not respected.

In addition, the switch may also be connected to further service circuits of the machine or plant to send reports based on the actual conditions.

In order to facilitate the operators in the immediate verification of the system status, the switch may be provided with one or more signal lights, generally of the LED type, which light up according to the various system states and/or to signal the status of the different circuits connected to the switch.

Usually, the signal lights are arranged on a front face of the housing of the fixed switching device and are defined by small indicator lights which turn ON/OFF according to the state of the controlled circuit, possibly also being adapted to assume different colors.

Examples of these solutions are disclosed in US2019178014 or also in WO2021/009601 and EP3078048, the latter two in the name of the same Applicant. A first drawback of these solutions lies in the fact that the use of small indicator lights as signal lights, as well as their front positioning, does not always make the reading of the lights and the interpretation of their meaning immediate and unmistakable, requiring the positioning of the operator near the switch and in such a position as to have the eyes precisely in correspondence with the lights themselves.

Other solutions, such as those disclosed in US2016064163 and U.S. Pat. No. 4,990,730, show push-button safety switches wherein a button is made fully illuminated to indicate the status of the system.

However, these solutions are also limited in the number and type of information that can be provided to the operator, as the lighting of the button will have the sole purpose of indicating the activation or deactivation status.

Scope of the Invention

The object of the present invention is to overcome the above drawbacks by realizing a safety switch for guarding the access to safety barriers or fences for industrial machines and plants which has features of high efficiency and relative cost effectiveness.

A particular object is to provide a safety switch which allows a quick and safe reading of the luminous signals associated with the various operating conditions of the power and/or signaling circuits associated therewith.

Still another object is to provide a safety switch wherein the reading of the signal lights may also be carried out by an operator who is not placed in front of the switch.

Still another object is to provide a safety switch that allows a user to set multiple combinations different from each other in the number and/or color of the signal lights so as to have a high degree of customization of the switch signaling function.

A further object is to provide a particularly light and compact switch.

These objects, as well as others that will become more apparent hereinafter, are achieved by a safety switch for guarding a safety access to an industrial machine or plant which, in accordance with claim 1, comprises a switching device adapted to be anchored to a fixed part of the access to be guarded and housing switching means for the control of one or more command and/or service circuits of the machine or plant, a driving device adapted to be anchored to the movable part of the access and adapted to interact with said switching means upon the opening/closing of the access for the opening/closing of one or more circuits, signaling means comprising one or more sources of light signals adapted to emit one or more light and/or visible signals representative of the state of said one or more circuits.

The switching device has at least one portion or cap made of a transparent or translucent material which encloses one or more of said sources of light signals to make them visible from the outside at least in the powered condition.

Thanks to this combination of features, the switch will allow an operator to have a clear and immediate view of the status of the various circuits, even if it is not located in the immediate proximity of the switch and even if he/her is not placed in front of it. In particular, the portion or cap in the transparent or translucent material will be visible from at least two sides, preferably from three sides of the housing, to be visible at least in part also for operators placed laterally to the switch.

Furthermore, the greater surface available for positioning the signal lights will allow greater customization of the light signals as it will be possible to arrange more lights side by side and consequently have greater possibilities of combinations.

According to a further particularly advantageous aspect, not necessarily connected to the presence of the above portion or cap, first anchoring means are placed exclusively on the head of the casing of the switching device and may comprise at least one pair of through holes made in at least one of the front faces of said head for the insertion of respective fastening members.

This particular embodiment will allow to have a particularly compact structure for the switching device, which will be more easily installed even at light accesses, as well as cheaper and therefore preferable for those situations in which no particular safety functions are required.

Advantageous embodiments of the invention are obtained in accordance with the dependent claims.

BRIEF DISCLOSURE OF THE DRAWINGS

Further features and advantages of the invention will become more apparent in the light of the detailed description of preferred but not exclusive embodiments of a safety switch according to the invention, shown by way of non-limiting example with the aid of the attached drawing tables wherein.

Figure 1:
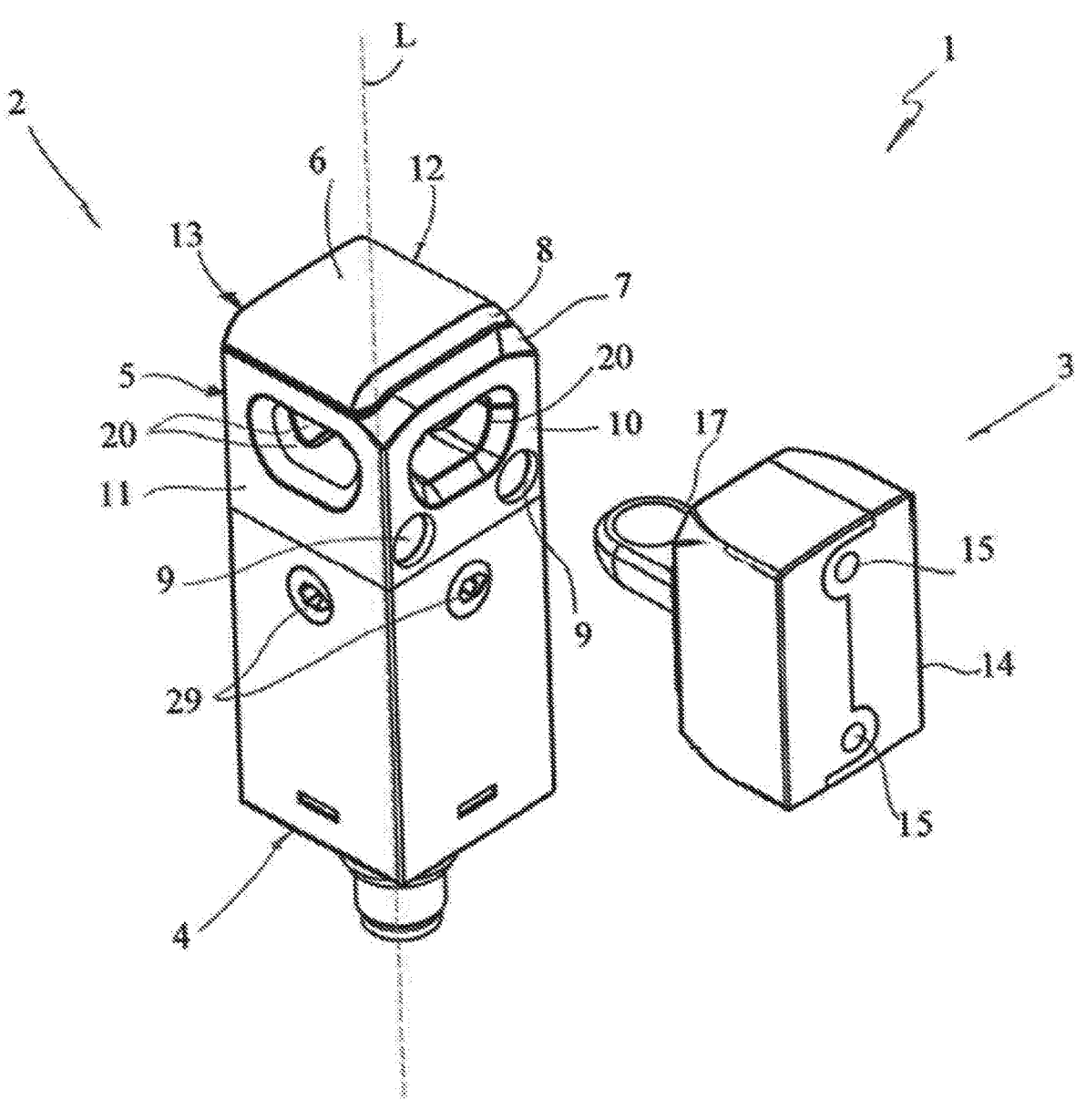
FIG. 1 is a perspective view of the switch according to the invention in a first preferred embodiment and in a first operating condition.

FIGS. from 3 to 5 are three sectional views of the switch of FIG. 1 in an operational sequence of closing and blocking of an access;

FIGS. 6 to 9 are four partial sectional views of the switch in a second preferred embodiment in an operational sequence of closing and blocking of the access.

BEST MODES OF CARRYING OUT THE INVENTION

With reference to the attached figures, preferred but not exclusive embodiments of a safety switch according to the invention are shown and generally designed to guard an access to an industrial machine or plant.

As visible from FIG. 1, the switch, globally referred as 1, will be designed to be applied, preferably but not exclusively, to a protection designed as a barrier or movable panel, not shown as known per se, suitable for preventing unsafe access to a security perimeter or other operating area where a machine or industrial plant is in action.

In an also known manner, the switch 1 will be designed to be applied to the protection at an access thereof to interrupt the operation of the machine or plant, or of one or more selected parts of the machine or plant, in an immediate or timed manner, upon opening of the access or even only in the presence of a request to open the access.

The access may be of any type, for example either hinged or sliding, of the right or left type, without particular limitations.

In the illustrated embodiment, the switch 1 is of the electronically operated type, i.e. equipped with a remote communication system between the switching part and the driving part, as described more clearly below.

However, according to an alternative embodiment, not shown, the switch 1 may also be mechanically or electro-mechanically operated with a key actuator.

In its most essential form, the switch 1 comprises a switching device 2 adapted to be anchored to a fixed part of the access to be guarded and a driving device 3 adapted to be anchored to the movable part of the access.

The ways of anchoring the switching device 2 and the driving device 3 to the respective parts of the access are of a known type and are not part of the present invention. A preferred but not exclusive configuration will be described below.

The switching device 2 comprises a casing 4 housing thereinside switching means, not visible in the figures but with a per se known configuration, suitable for being operatively connected to one or more electrical and/or electronic circuits for powering and/or controlling the main circuit and/or the service and emergency circuits of the machine or plant, always in a known manner.

The switching means may be selected from those commonly used in the technical field and may also vary depending on the functionality of the switch 1, without particular limitations.

The connection methods of the switching means will be selected from those typical for this type of product and these too will not be described in more detail below.

The casing 4 may also house control means, for example a microprocessor or CPU, not shown, suitable for receiving input signals from the control and/or service circuits through respective communication channels to verify their correct operation.

In this way, the control means may control the switching means to send an error signal and/or stop the plant in case of absence of a communication signal from one of the communication channels or in case of non-conformity detection.

The control means are also connected to signaling means adapted to emit one or more light and/or visible signals and possibly also sound signals representative of the state of one or more of the circuits which the switch 1 is connected to each time, in order to provide, for example, information on the open or closed status of the access, or its unlocking in a still closed condition, or error situations or other conditions that require the attention of the operators.

The casing 4 also comprises a top head 5 which will be designed to interact with the driving device 3 and allow the interaction of the latter with the switching means, according to the methods described below.

The head 5 comprises at least one portion or cap 6 made of a transparent or translucent material which encloses therewithin at least part of the signaling means and in particular one or more indicator lights or sources of light signals which will thus be visible, at least in the powered condition, through the portion or cap 6.

According to the exemplary but non-limiting embodiment of the figures, the cap 6 will preferably be applied to the upper face 7 of the head 5, substantially for its entire surface development, in a fixed or removable manner, for example if one wishes to intervene on the warning lights.

The positioning of the cap 6 on the upper face 7 will allow the visibility of the signal lights even in the case of non-frontal positioning of the operator with respect to the switching device 2.

However, it is understood that the cap 6 may also be arranged on other parts of the casing 4, for example on its lower face or on a portion of the casing 4 or of the head 5 intermediate between the end faces.

Conveniently, regardless of its position on the casing 4 and/or head 5, the portion or cap 6 will extend at least partially on at least two faces of the casing 4 and/or of the head 5, preferably on at least three faces, so as to be visible from at least two, preferably three sides and not just frontally.

The cap 6 may possibly be designed to create a magnification effect and improve the visibility of the lights.

Furthermore, the cap 6 will be provided with a front edge 8, also transparent or translucent, which will allow the visualization of the light signals also in front of the casing 4.

According to a variant, the cap 6 may be provided with a rounded edge or front camber suitable to allow the view of the signal lights also from the front position.

According to further variants, not shown, the cap 6 may be arranged on any part of the casing 4 and/or the head 5 or constitute a transparent portion thereof.

The number of signal lights or light sources that may be positioned inside the portion or cap 6, as well as their mutual position, may vary according to the needs and availability of space in the portion or cap 6 itself, without particular limitations at least from a theoretical point of view.

For example, the light sources may be arranged in one or more rows, each comprising two or more signal light sources.

Preferably, the signal lights or signal sources will be LED lights adapted to emit respective luminous signals which may be differentiated by color and/or switching on/off frequency, according to the needs of the specific user.

According to yet another variant, there may also be a single RGB-type LED light, or multiple RGB-type LED lights, adapted to turn into different colors depending on the status to be reported.

According to the preferred but not exclusive embodiment of the figures, the switching device 2 will comprise first anchoring means 9 for the anchoring to the movable part of the frame which will be placed exclusively on the head 5 and which, in the illustrated exemplary embodiment, are defined by a pair of through holes made in a pair of mutually opposite front faces 10, 13 of the head 5, for the insertion of respective fastening members, such as screws, pins or the like, not shown.

According to not shown a variant, the first anchoring means may be defined by two pairs of through holes, each made on a respective pair of front faces 10, 13; 11, 12 opposed with each other.

Conveniently, the cap 6 will also extend on the lateral edges of the head 5 so as to partially occupy at least one, preferably two of the front faces, in particular the two mutually opposite side faces 11, 12, to be visible from at least two, preferably three sides and not just frontally.

The driving device 3 will comprise an anchoring body 14 provided with second anchoring means 15 for anchoring to the movable part of the access and associated with an actuator 17 having a first end 18 fixed to the anchoring body 14 and a second end 19 projecting transversely from the anchoring body 14 and which will interact with the switching means.

To this end, the head 5 will be provided with one or more slots 20 made in at least one of its front faces 10-13 to allow the insertion of the actuator 17 inside it and the consequent interaction with the switching means.

In the preferred but not exclusive embodiment of the figures, the head 5 will be provided with at least three slots 20 made on corresponding front faces 10-12 so that the switching device 2 may always be anchored with the same orientation, but still allowing interaction with the driving device 3, regardless of the direction of approach of the latter, which will instead depend on the type of access closure.

Figure 2:
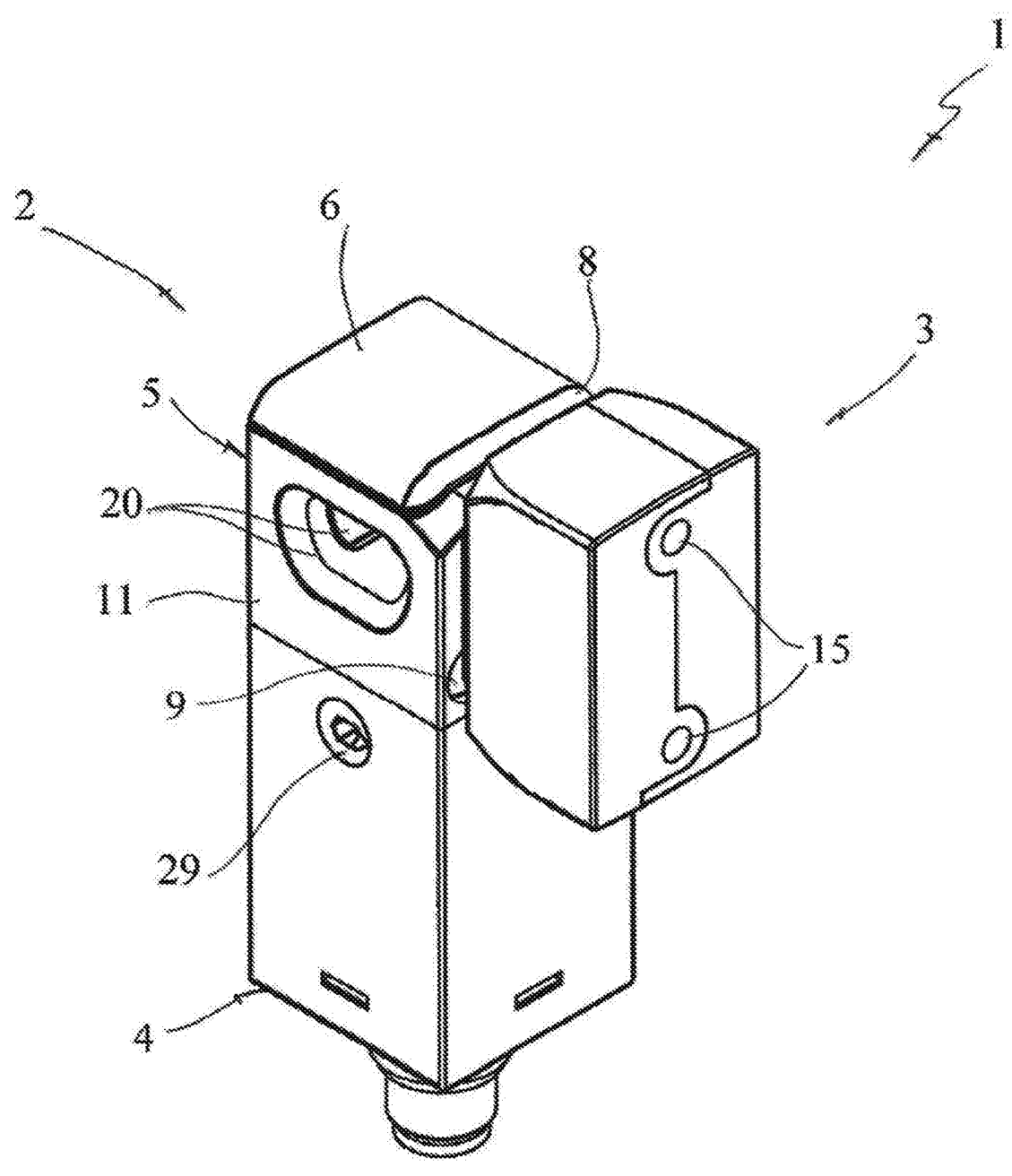
FIG. 2 is a perspective view of the switch of FIG. 1 in a second operating condition.

FIG. 1 shows the switch 1 in the open access condition wherein the actuator 17 is extracted from the head 5 while FIG. 2 shows the switch 1 in the closed access condition, not necessarily locked, wherein the actuator 17 is inserted into the head 5 through one of the slots 20.

In this embodiment the head 5 may be integral and unitary with the casing 4 or removably anchored thereto but according to a single possible coupling way. However, according to an alternative variant, not shown, the head 5 may be orientable with respect to the casing 4, for example according to at least three, preferably four different orientation directions each rotated 90° with respect to each other, and in this case the head 5 may be provided with a smaller number of slots 20, possibly even a single slot.

In the preferred embodiment of the figures, the switch 1 will be of the electronically operated type, i.e. the interaction between the driving device 3 and the switching means will be controlled by a remote electronic signal transmitted to the switching means by the driving device 3 when this latter is at a minimum predetermined distance from the switching device 2, such as to hold the access in a closed and safe condition.

To this end, the actuator 17 houses a first communication element 21 of the transmitting type adapted to interact remotely with a second communication element 22 of the receiving type housed in the head 5 and adapted to communicate with the first communication element 21 by means of said presence signal, once the first communication element 21 has entered the head 5 by effect of the insertion of the actuator 17 in one of the slots 20.

According to an alternative variant, the first remote communication element 21 may be of the receiving type to receive a presence signal sent by the second remote communication element 22, which will therefore be of the transmitting type.

According to a first embodiment, the receiving element can be an antenna of the RFID (Radio Frequency Identification) type designed to receive a remote control signal transmitted by the transmitting element, which can instead be a transponder, when the latter is at the minimum detectable distance from the antenna.

In particular, the transponder may be provided with an RFID tag with an identification code that will be received by the receiving element and which must be recognized by the control means, suitably equipped with a CPU, in order to allow the machine or system to start.

The recognition of the code can be unique or generic, depending on whether you want to make a switch with a high or low level of coding.

Advantageously, the RFID tag will be coded so that it can be uniquely recognized by the receiving element and prevent the use of actuators other than the one connected to the driving device 3, avoiding the risk of unsafe access openings.

However, it is understood that the transmitting element may also be of another type, for example with an electromechanical action, such as a key actuator, or operating by means of magnetic or electromagnetic, optical, mechanical, induction, pressure or other type sensors, and consequently the receiving element will adapt to the nature of the transmitting element.

Figure 3:
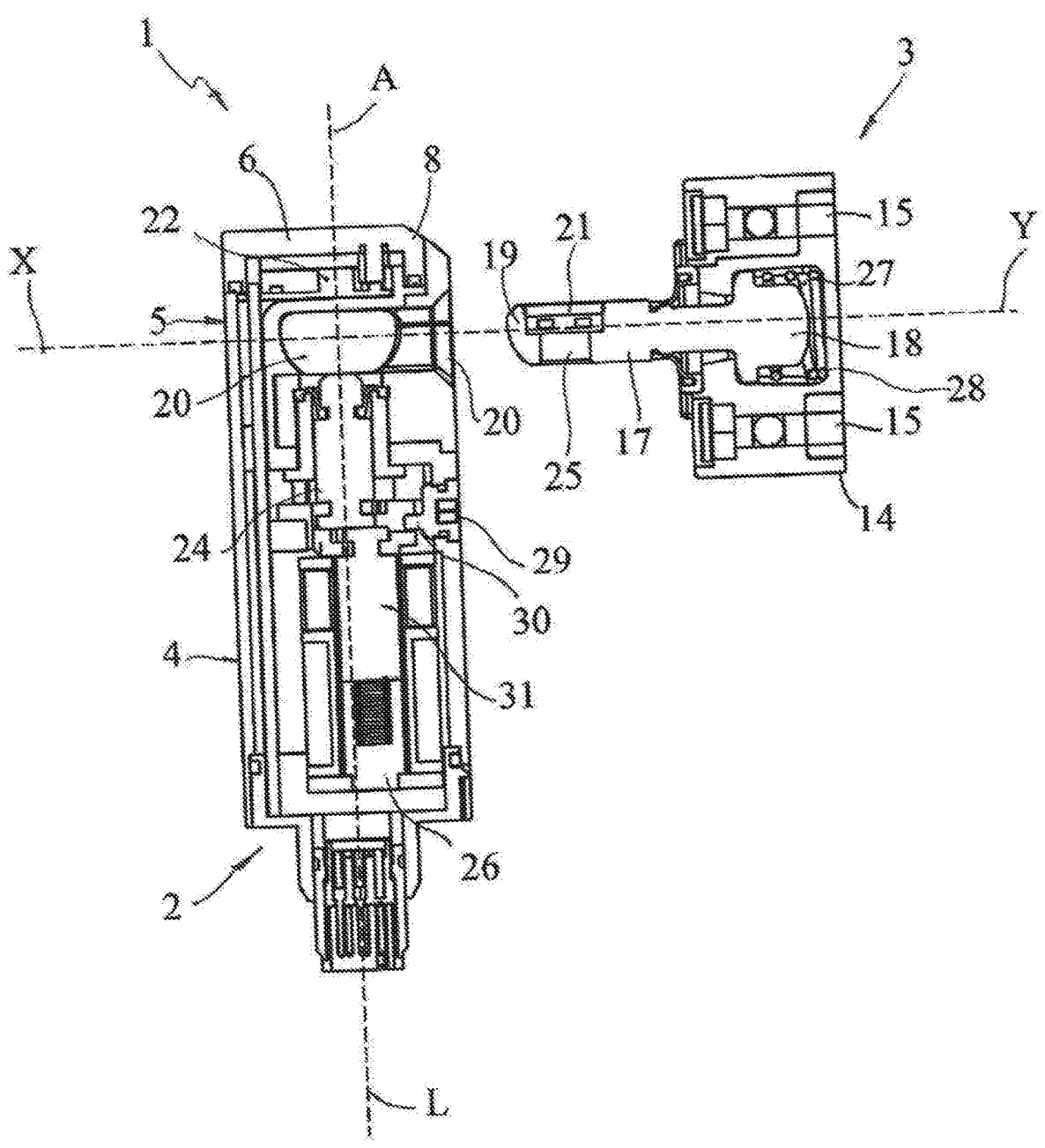
Figure 4:
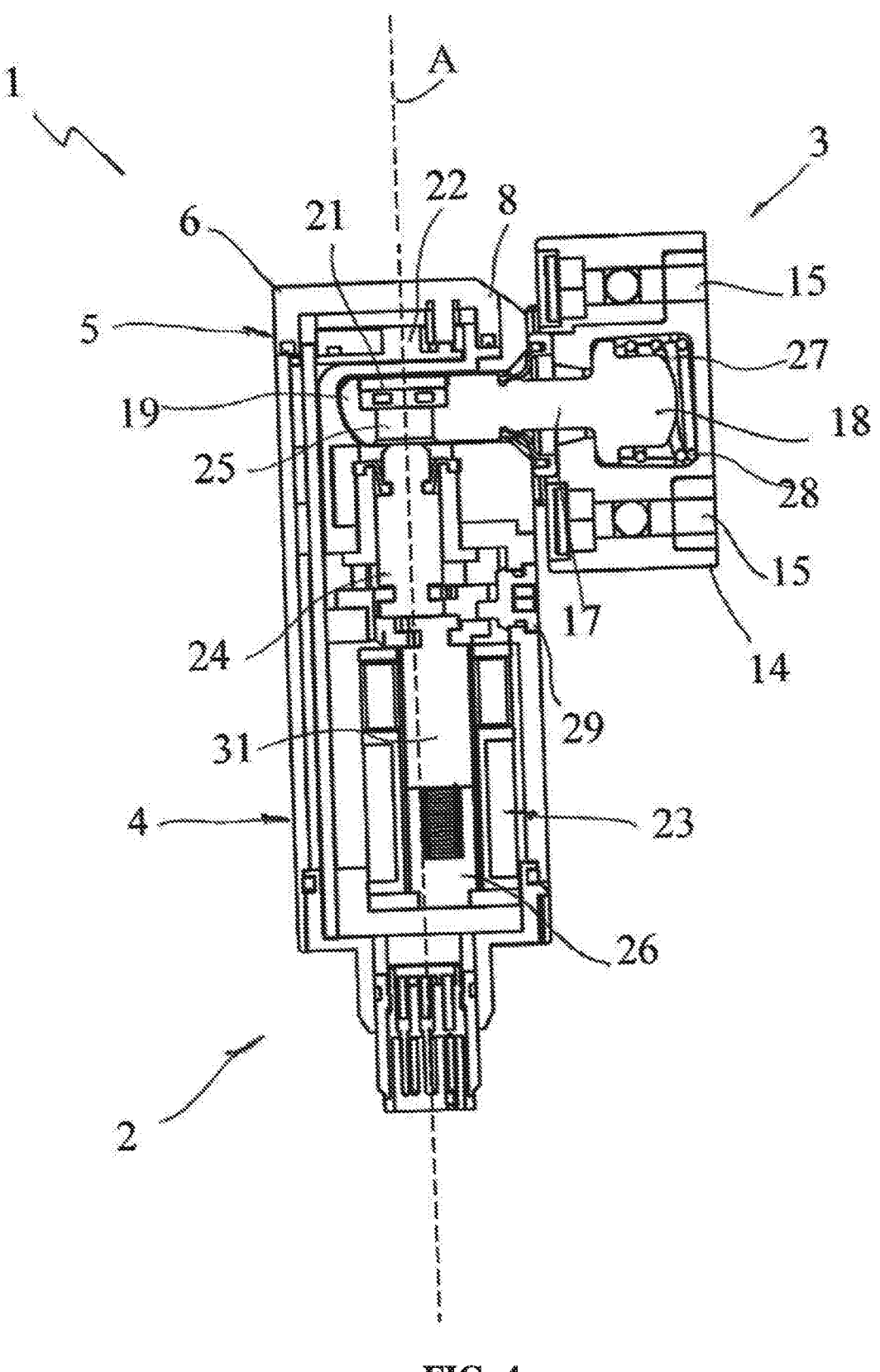
Figure 5:
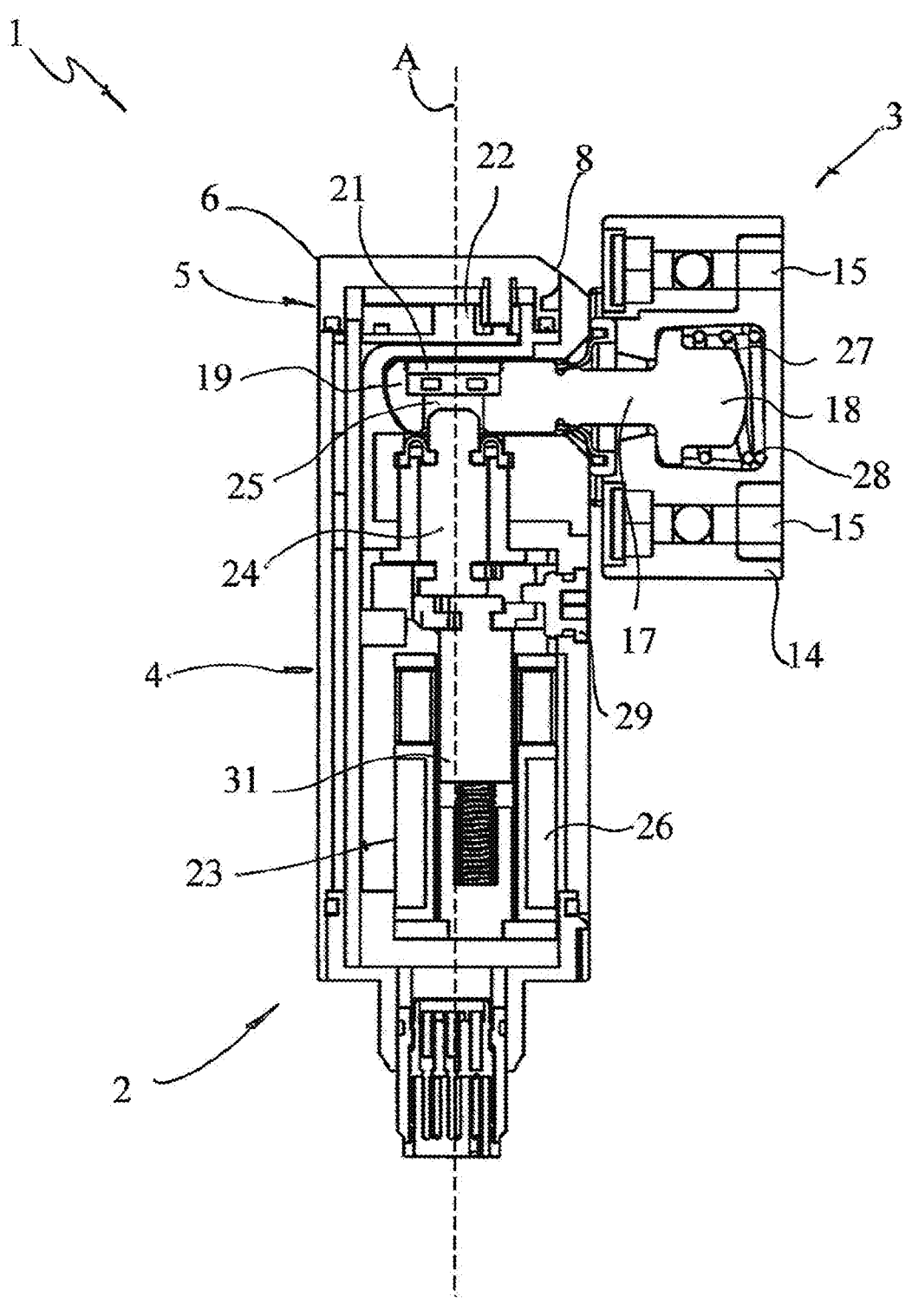
Figure 6:
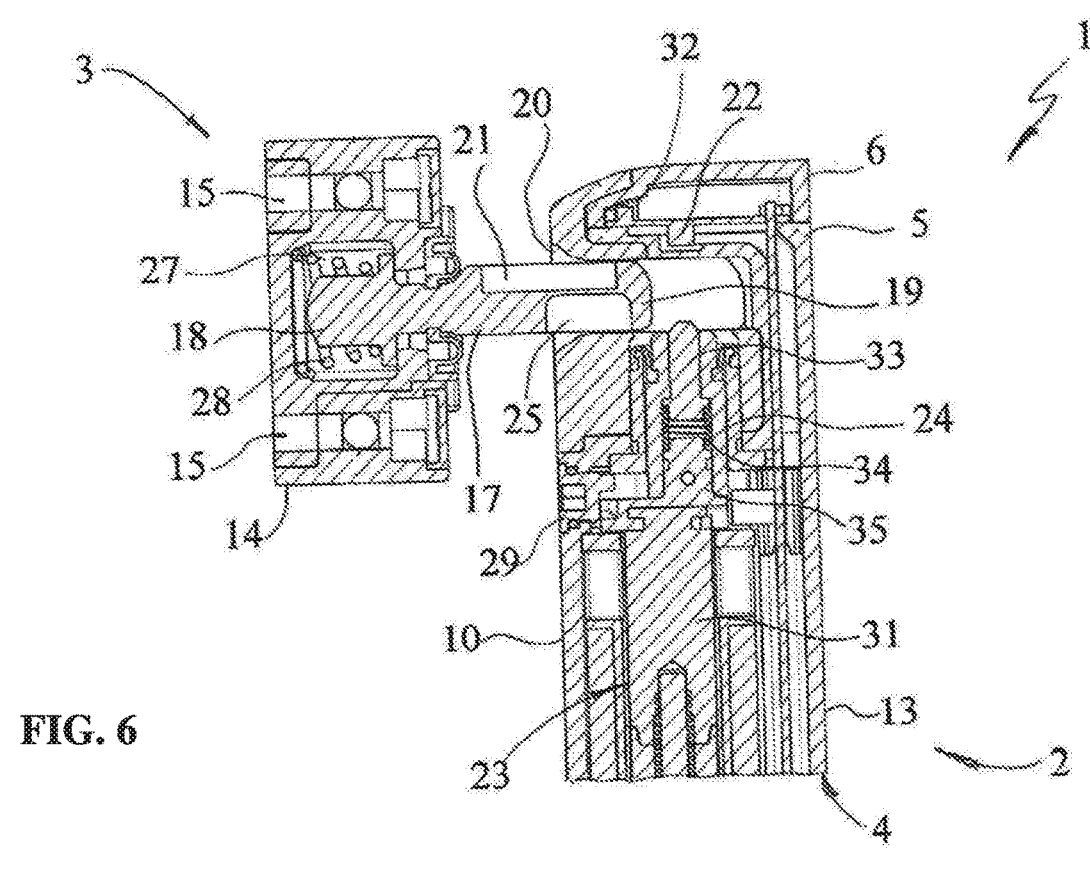

As visible from the sections of FIGS. 3-5, the casing 4 houses locking/unlocking means 23 of the actuator 17 provided with a locking pin 24 movable along a predetermined axis A, substantially parallel to the main direction of development L of the casing 4 and orthogonal to the direction of insertion X of the actuator 17 inside the head 5. The pin 24 will be designed to move between a raised access lock position, wherein it engages the actuator 17 to retain it inside the head 5, and a lowered release position, in which the actuator 17 is not engaged by the pin 24 and at which the switching means turn into the open condition.

In turn, the actuator 17 is provided with a seat 25 for the insertion of one end of the locking pin 24, which seat 25 will be arranged in such a position as to be aligned with the locking pin 24 when the actuator 17 is fully inserted into the head 5.

In this text, the expression "completely inserted" refers to the position of the actuator 17 inside the head 5 such as to allow the access to be considered properly closed. The seat 25 may be defined by a concavity, or even by a hole, of suitable inlet diameter and made in the lower face of the second end 19 of the actuator 17 to allow the at least partial insertion of the upper end of the movable pin 24, such to prevent access from being opened when the locking/unlocking means are in the locking configuration. The first communication element 21 is placed peripherally to the seat 25, possibly incorporated in the second end 19 of the actuator 17, while the second communication element 22 will be arranged inside the head 5 so as to be aligned with the first communication element 21 when the actuator 17 is completely inserted in the head 5. The sections of FIGS. 3-5 show an operational sequence of closing and locking an access, wherein at the beginning the actuator 17 is outside to the head 5 (FIG. 3) as the access is open, to then be inserted through one of the slots 20 and allow the interaction between the two remote communication elements 21, 22 (FIG. 4).

This last embodiment corresponds to the closed but not locked access condition since the locking pin 24 is still in the lowered position.

The recognition of the tag 21 by the antenna 22 will allow the activation of the locking/unlocking means 23.

For example, an electromagnet 26 or other electromechanical, electric, hydraulic or pneumatic actuator device housed in the casing 4 may be powered or switched off, depending on the type of operation, to cause the locking pin 24 to move upwards or downwards, according to methods known in the sector and therefore not described in greater detail, so that it fits into the seat 25 of the actuator 17, locking it inside the head 5 (FIG. 5), or promoting its translation downwards to unlock the access.

The actuator 17 may also have a limited oscillation with respect to a transverse axis Y to allow the recovery of any misalignments between the switching device 2 and the driving device 3 that may occur during assembly or following its use.

To this end, the presence of a spring or other elastic element 28 inside the housing 27 to engage the first end 18 of the actuator 17 will allow the actuator 17 to remain articulated, always returning to the axially aligned position.

The locking/unlocking means 23 will also be suitably provided with an auxiliary manual release mechanism designed to allow access to be unlocked, for example in emergency situations.

The auxiliary release mechanism comprises one or more auxiliary release commands 29, for example one or more releases with a hexagonal key, connected to the locking pin 24 to force it to slide towards the release position, the lower one in the illustrated configuration, also when the actuator 17 is inserted in the head 5 and the access is closed.

In particular, each auxiliary release 29 will be provided with a cam element 30 which will operate on a slide 35 connecting a slider 31 with the locking pin 24 to force it downwards and obtain the release of the actuator 17.

According to a particularly advantageous aspect, the auxiliary release mechanism will be provided with three auxiliary release controls 29 arranged on three different front faces 10, 11, 12 of the casing 4, i.e. on the faces of the casing 4 provided with the slots 20 and/or which in use will always be accessible from the outside.

Therefore, in the illustrated embodiment, having only one pair of anchoring holes 9 and wherein the orientation of the switching device 2 during the anchoring is univocal, the only face not provided with the auxiliary release control 29 will be the face 13 designed to be placed in contact with the frame of the fixed part of the access.

FIGS. 6 to 9 show a sequence of closing and locking of an access operated by means of a switch 1 provided with a switching device 2 made according to a second preferred embodiment.

This embodiment differs from the previous one first of all in the shape of the cap 6, although this shape may, in any case, be integrated in a switching device 2 according to the previous embodiment.

In addition, the cap 6 houses one or more signal lights, for example a single LED light 32, designed to project a 90° oriented light beam and which will illuminate the entire portion or cap 6.

However, this solution may also be implemented in a switching device 2 according to the previous embodiment.

A further difference, on the other hand, is represented by the presence of an auxiliary retaining pin 33 arranged in the casing 4 parallel to the release pin 24 and which has independent movement with respect thereto.

In particular, the retaining pin 33 has the object of interacting with the actuator 17 only when the release pin 24 is in the lowered inoperative configuration in order to exert a slight holding force on the actuator 17 having sufficient intensity to avoid unwanted opening of the access caused by vibrations, gusts of wind or other unexpected stresses when the access is unlocked.

In the illustrated embodiment, the retaining pin 33 is coaxial and internal to the locking pin 24 and is moved by a spring 34, also internal to the locking pin 24, which in the lower part rests on a surface of the slide 35 integral with the locking pin 24 in such a way that when the locking pin 24 is in the lowered inoperative position (FIG. 6) the slide 35 cannot further move downward.

Figure 7:
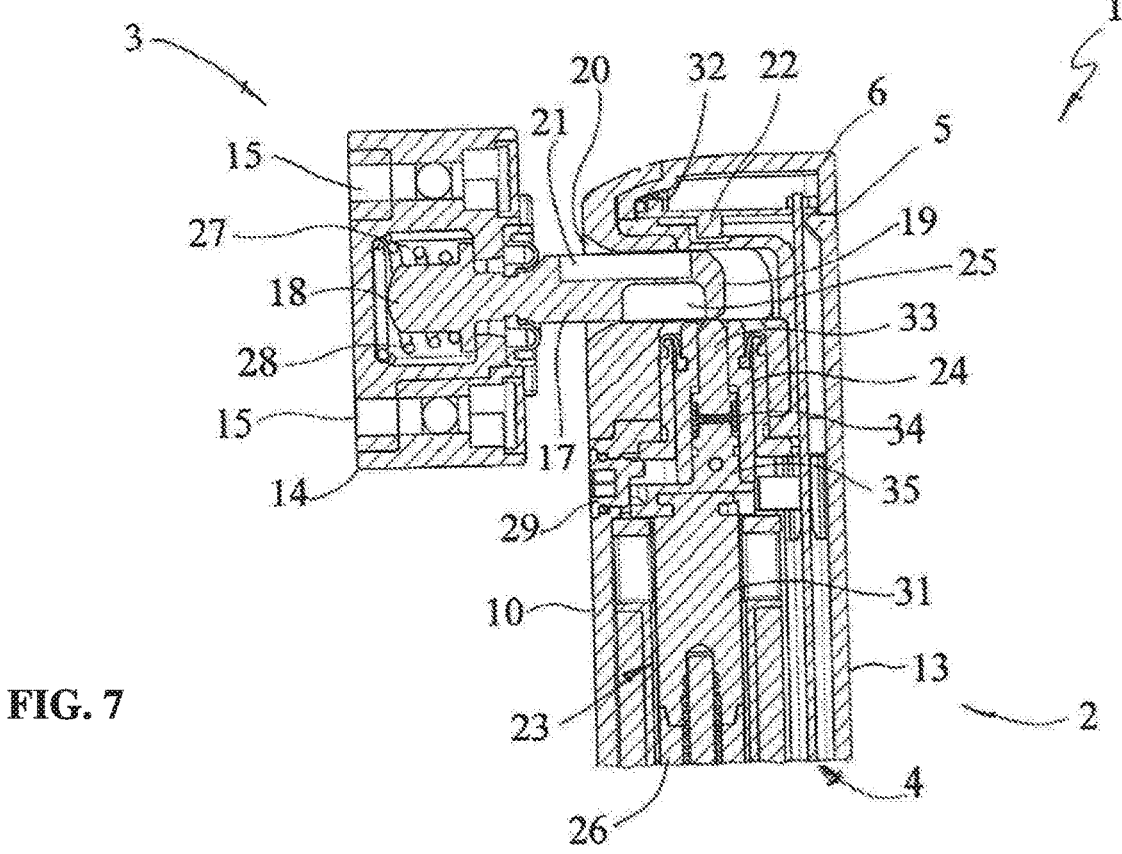
Figure 8:
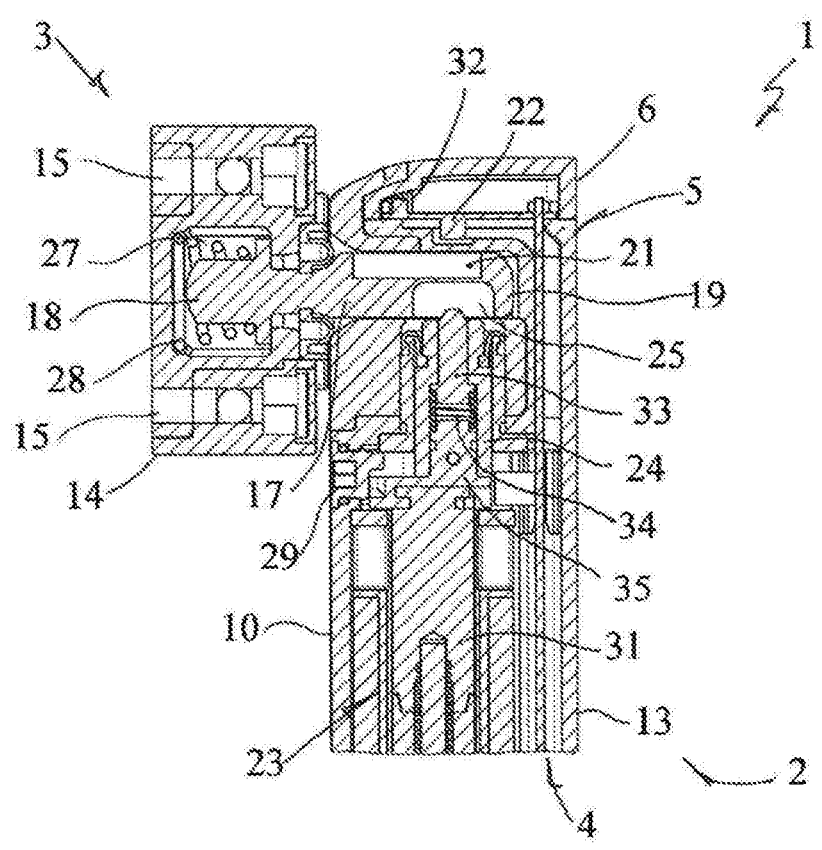

The retaining pin 33 will be sized to project from the upper end of the locking pin 24 and the spring 34 will operate so that the retaining pin 33 always projects slightly inside the head 5, so as to fit into the seat 25 of the actuator 17 after its insertion into one of the slots 20, as shown in the sequence of FIGS. 7 and 8.

Figure 9:
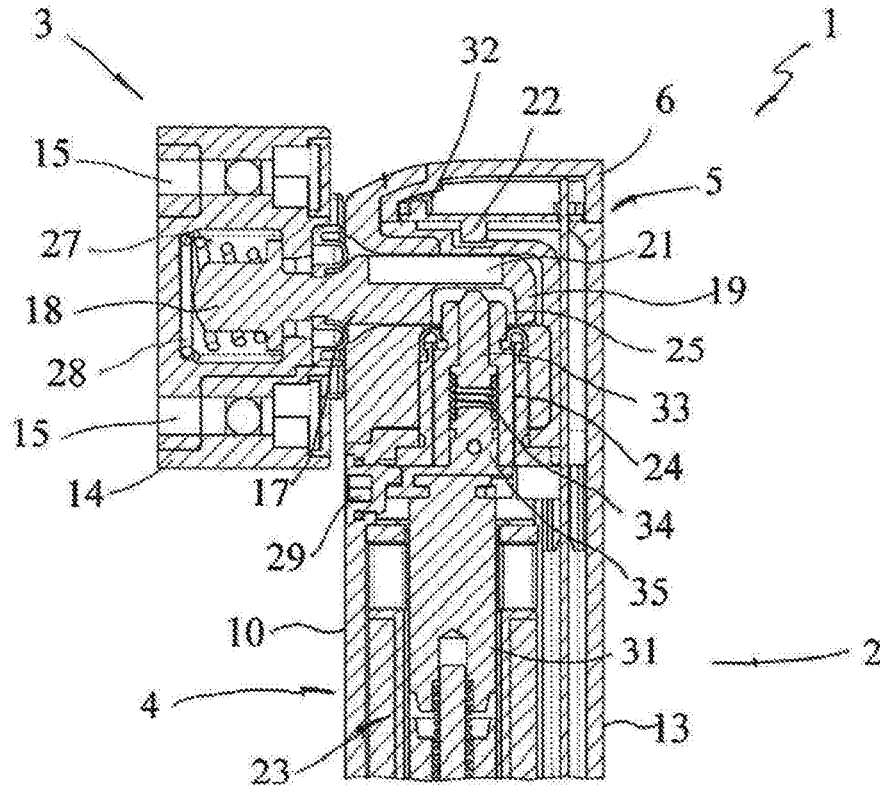

On the other hand, FIG. 9 shows the condition of the locking pin 24 in the raised access locking position, wherein the retaining pin 33 will not interact with the actuator 17. From above it is evident that the switch according to the invention fulfills the intended objects.

The invention claimed is:

1. A safety switch for guarding access to industrial machines and plants, comprising:
    a switching device (2) adapted to be anchored to a fixed part of the access to be guarded and housing switching means for the control of one or more control and/or service circuits of the machine or plant;
    a driving device (3) adapted to be anchored to the movable part of the access and to interact with said switching means upon the opening/closing the access for opening/closing one or more circuits;
    signaling means comprising one or more sources of light signals adapted to emit one or more light and/or visible signals representative of the state of said one or more circuits;
    wherein said switching device (2) has at least one portion or cap (6) made of a transparent or translucent material which encloses one or more of said sources of light signals to make them visible from the outside at least in the powered condition,
    wherein said portion or cap (6) made of transparent or translucent material extends at least partially on at least two faces of said switching device (2), to be visible from at least two sides with respect to said switching device (2) when in the anchored position,

wherein said switching device (2) comprises a casing (4) housing thereinside switching means for controlling one or more control and/or service circuits of the machine or plant, and wherein said portion or cap (6) is arranged at an end face of said casing (4).

2. The safety switch as claimed in claim 1, wherein said portion or cap (6) made of transparent or translucent material extends at least partially on at least three faces of said switching device (2) to be visible from at least three sides with respect to said switching device (2) when in the anchored position.

3. The safety switch as claimed in claim 2, characterized in that said portion or cap (6) encloses one or more LED lights adapted to emit respective light signals differentiated by color and/or on/off frequency.

4. The safety switch as claimed in claim 1, characterized in that said portion or cap (6) made of transparent or translucent material extends at least partially on at least two faces, preferably on at least three faces of said casing (4).

5. The safety switch as claimed in claim 1, characterized in that said housing (4) comprises an upper head (5) designed to interact with said actuator device (3) for the activation of said switching means, said cap (6) being associated with said head (5).

6. The safety switch as claimed in claim 5, characterized in that said cap (6) is placed on the upper face (7) of said head (5).

7. The safety switch as claimed in claim 6, characterized in that said cap (6) extends at least partially on at least two faces, preferably on at least three faces of said head (5).

8. The safety switch as claimed in claim 7, characterized in that said driving device (3) comprises an anchoring body (14) for anchoring to the movable part of the access and an actuator (17) having a first end (18) fastened to said anchoring body (14) and a second end (19) projecting transversely from said anchoring body (14) and housing at least one first remote communication element (21) of the transmitting or receiving type adapted to interact remotely with said switching means by sending or receiving a presence signal.

9. The safety switch as claimed in claim 8, characterized in that said head (5) houses thereinside at least one second remote communication element (22) of the receiving or transmitting type adapted to communicate with said first remote communication element (21) through the exchange of said presence signal.

10. The safety switch as claimed in claim 9, characterized in that said head (5) is provided with at least one slot (20) made in at least one of said front faces (10-13) to allow the insertion of said actuator (17) thereinside and the approach of said first remote communication element (21) with respect to said second remote communication element (22).

11. The safety switch as claimed in claim 10, characterized in that said casing (4) houses locking/unlocking means (23) of said actuator (17) provided with a locking pin (24) movable along a predetermined axis (A) to engage said actuator (17) and retain it into said head (5).

12. The safety switch as claimed in claim 11, characterized in that said actuator (17) is provided with a seat (25) for the insertion of one end of said locking pin (24), said seat (25) being arranged in such a position as to be axially aligned with said locking pin (24) when said actuator (17) is completely inserted in said head (5).

13. The safety switch as claimed in claim 12, characterized in that said locking/unlocking means (23) comprise at least one auxiliary unlocking control associated with at least one of the front faces (10-12) of said casing (4) adapted to remain visible during use.

14. The safety switch as claimed in claim 13, characterized in that said first remote communication element (21) is arranged at said seat (25) and said second remote communication element (22) is positioned in said head (5) in such a position as to interact with said first remote communication element (21) when said actuator (17) is completely inserted into said head (5).

15. The safety switch as claimed in claim 14, characterized in that said first anchoring means (9) are associated exclusively with said head (5).

16. The safety switch as claimed in claim 15, characterized in that said first anchoring means (9) comprise at least one pair of through holes made in at least one of the front faces (10-13) of said head (5) for the insertion of respective fastening members.

*  *  *  *  *